US010694258B2

(12) United States Patent
Kaiser et al.

(10) Patent No.: US 10,694,258 B2
(45) Date of Patent: Jun. 23, 2020

(54) STARTUP TIMES OF STREAMING DIGITAL MEDIA PLAYBACK

(75) Inventors: Christian Kaiser, San Jose, CA (US); Jean-Marie White, San Jose, CA (US); Yung-Hsiao Lai, Fremont, CA (US)

(73) Assignee: NETFLIX, INC., Los Gatos, CA (US)

( * ) Notice: Subject to any disclaimer, the term of this patent is extended or adjusted under 35 U.S.C. 154(b) by 169 days.

(21) Appl. No.: 13/326,122

(22) Filed: Dec. 14, 2011

(65) Prior Publication Data

US 2013/0160146 A1    Jun. 20, 2013

(51) Int. Cl.
| | |
|---|---|
| *H04N 21/643* | (2011.01) |
| *H04N 21/835* | (2011.01) |
| *H04N 21/4405* | (2011.01) |
| *H04N 21/254* | (2011.01) |
| *H04N 21/6334* | (2011.01) |
| *H04N 21/84* | (2011.01) |

(52) U.S. Cl.
CPC ... *H04N 21/64322* (2013.01); *H04N 21/2541* (2013.01); *H04N 21/4405* (2013.01); *H04N 21/63345* (2013.01); *H04N 21/835* (2013.01); *H04N 21/84* (2013.01); *H04L 2463/101* (2013.01)

(58) Field of Classification Search
CPC .................................................. G06Q 2220/18
USPC .......................................................... 705/59
See application file for complete search history.

(56) References Cited

U.S. PATENT DOCUMENTS

| | | | | |
|---|---|---|---|---|
| 5,892,900 A | * | 4/1999 | Ginter | G06F 21/10 726/26 |
| 7,382,879 B1 | | 6/2008 | Miller | |
| 8,010,984 B2 | * | 8/2011 | Thukral | H04N 21/47202 725/86 |
| 8,910,044 B1 | * | 12/2014 | Emigh | G06Q 10/109 715/716 |
| 8,949,592 B2 | * | 2/2015 | Moroney | H04L 63/10 713/151 |
| 2003/0131353 A1 | | 7/2003 | Blom et al. | |
| 2004/0139027 A1 | | 7/2004 | Molaro | |
| 2004/0186993 A1 | | 9/2004 | Risan et al. | |
| 2007/0156845 A1 | | 7/2007 | Devanneaux | |
| 2007/0174230 A1 | * | 7/2007 | Martin | G06F 3/04812 |
| 2008/0148363 A1 | * | 6/2008 | Gilder et al. | 726/4 |
| 2008/0172678 A1 | * | 7/2008 | Lee | G06F 21/10 719/315 |

(Continued)

FOREIGN PATENT DOCUMENTS

| | | |
|---|---|---|
| CN | 101539911 A | 9/2009 |
| EP | 2194471 A1 | 6/2010 |

OTHER PUBLICATIONS

International Search Report for application PCT/US2012/069218 dated Feb. 15, 2013.

(Continued)

*Primary Examiner* — Chinedu C Agwumezie
(74) *Attorney, Agent, or Firm* — Artegis Law Group, LLP (57) ABSTRACT

Techniques are provided for streaming digital media content. In one embodiment, metadata associated with a digital media content title is retrieved prior to receiving any user request to play the digital media content title. Upon receiving a user request to play the digital media content title, a license is requested based on the retrieved metadata. Upon receiving the license, streaming playback of digital media content title begins.

23 Claims, 5 Drawing Sheets

(56) References Cited

U.S. PATENT DOCUMENTS

| | | | | |
|---|---|---|---|---|
| 2011/0047080 A1* | 2/2011 | Im et al. | | 705/59 |
| 2012/0151342 A1* | 6/2012 | Trotta | G06F 3/0482 | 715/716 |
| 2012/0158547 A1* | 6/2012 | Wood | G06Q 30/0601 | 705/27.1 |
| 2012/0195208 A1* | 8/2012 | Abel et al. | | 370/252 |
| 2012/0281965 A1* | 11/2012 | Hunt | H04N 5/76 | 386/241 |
| 2012/0331167 A1* | 12/2012 | Hunt | | 709/231 |
| 2013/0024951 A1* | 1/2013 | Bjorkengren | G06F 21/10 | 726/30 |

OTHER PUBLICATIONS

Analysis of Netflix's security framekwork for "Watch Instantly" service, Pomelo, LLC Tech Memo, Mar. 1, 2009, pp. 3-6, http://pomelollc.files.wordpress.com.

Extended European Search Report for Application No. 12858501.5 dated May 28, 2015.

Rayburn, "How Dynamic Site Acceleration Works, What Akaami and Cotendo Offer," blog.streammedia.com, Oct. 18, 2010, 8 pages, http://blog.streammedia.com/2010/10/how-dynamic-site-acceleration-works-what-akamai-and-contendo-offer.html.

* cited by examiner

STARTUP TIMES OF STREAMING DIGITAL MEDIA PLAYBACK

BACKGROUND

Field

Embodiments of the present invention relate generally to digital media and, more specifically, to improving startup times of streaming digital media playback.

Description of the Related Art

Digital media content distribution systems conventionally include a content server, a content player, and a communications network connecting the content server to the content player. The content server is configured to store digital media content files, which can be downloaded from the content server to the content player. Each digital media content file corresponds to a specific identifying title, such as "Gone with the Wind," which is familiar to a user. The digital media content file typically includes sequential content data, organized according to playback chronology, and may comprise audio data, video data, or a combination thereof.

The content player is configured to download and play a digital media content file, in response to a user request selecting the title for playback. The process of playing the digital media content file includes decoding audio and video data into a synchronized audio signal and video signal, which may drive a display system having a speaker subsystem and a video subsystem. Playback typically involves a technique known in the art as "streaming," where the content server sequentially transmits the digital media content file to the content player, and the content player plays the digital media content file while content data is received that comprises the digital media content file.

SUMMARY

Embodiments of the invention provide a computer-implemented method, computer-readable storage medium, and system for performing an operation for a client device to obtain authorization to stream a requested media title. The operation includes outputting, for display in a user interface, a plurality of media titles available for streaming playback. The operation also includes, prior to receiving a user request to begin streaming playback of any of the plurality of media titles, retrieving digital rights management (DRM) data associated with at least a first one of the plurality of media titles. The operation also includes, upon receiving the request to play the first media title, generating, based at least in part on the DRM data, a request for a license authorizing playback of the first media title. The operation also includes, upon receiving the license for the first media title, beginning streaming playback of the first media title.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention provide techniques for acquiring authorization for streaming digital media content. One embodiment provides an endpoint device that retrieves metadata associated with a digital media content title, prior to receiving any user request to play the digital media content title. The metadata may be retrieved upon detecting that a trigger condition is satisfied. Upon subsequently receiving a user request to play the digital media content title, the endpoint device generates a digital rights management (DRM) license request, based on the retrieved metadata. The endpoint device then sends the request to a DRM server. Upon receiving a DRM license from the DRM server, the endpoint device plays the digital media content title, responsive to the user request. Note while the endpoint may wait until receiving the DRM license to begin downloading the title, the endpoint device may also begin downloading title (without decrypting it) prior to receiving the license from the DRM server. Advantageously, the perceived (and actual) delay between the time a user requests to play a digital media content title and the time playback of the digital media content title commences may be reduced in some cases.

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
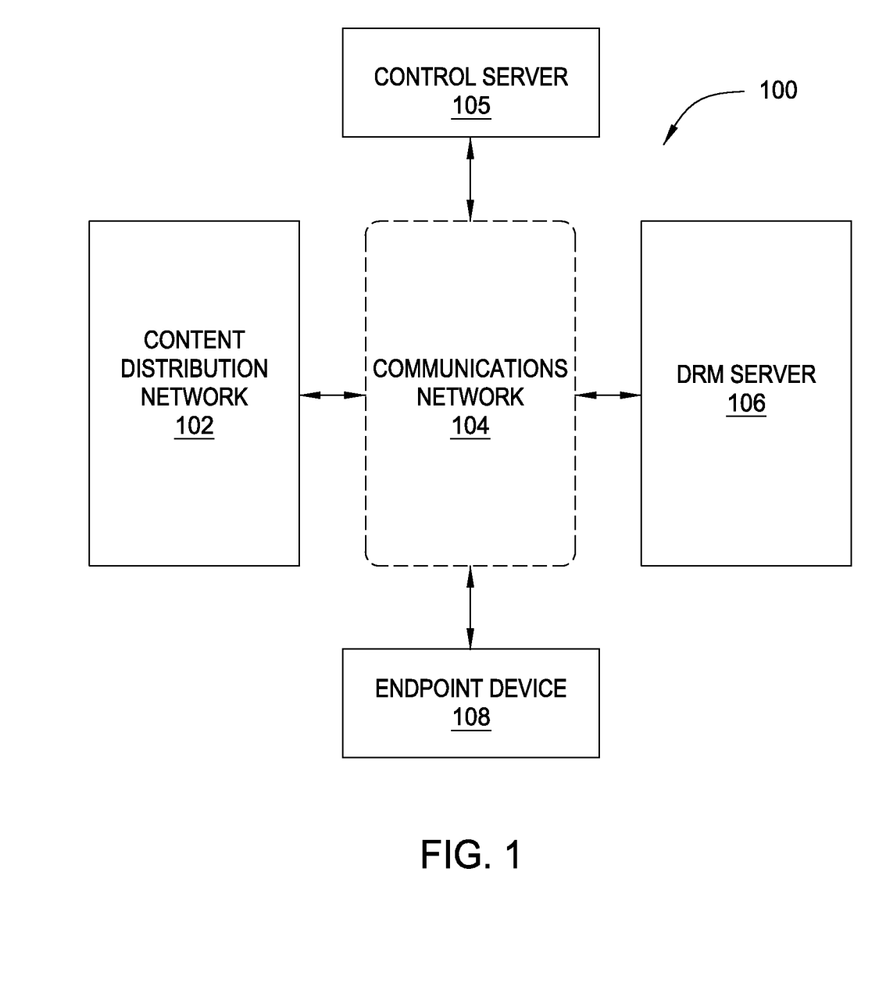
FIG. 1 illustrates a content distribution system configured to implement one or more embodiments presented in this disclosure.

FIG. 1 is a block diagram illustrating a content distribution system 100 configured to implement one or more embodiments presented in this disclosure. As shown, the content distribution system 100 includes a content distribution network (CDN) 102, a communications network 104, a control server 105, a digital rights management (DRM) server 106 and an endpoint device 108.

In one embodiment, the communications network 104 includes a plurality of network communications systems, such as routers and switches, configured to facilitate data communication between the CDN 102, the control server 105, the DRM server 106 and the endpoint device 108. Persons skilled in the art will recognize that many technically feasible techniques exist for building the communications network 104, including technologies practiced in deploying the well-known internet communications network.

In one embodiment, the endpoint device 108 may be a computer system, a set top box, a mobile device such as a mobile phone, or any other technically feasible computing platform that has network connectivity and is coupled to or includes a display device and speaker device for presenting video frames and generating acoustic output.

In one embodiment, the CDN 102 includes one or more computer systems configured to serve download requests for digital content files received from the endpoint device 108. The digital content files may reside on a mass storage system accessible to the computer system. The mass storage system may include, without limitation, direct attached storage, network attached file storage, or network attached block-level storage. The digital content files may be formatted and stored on the mass storage system using any technically feasible technique. A data transfer protocol, such as the well-known hyper-text transfer protocol (HTTP), may be used to download digital content files from the CDN 102 to the endpoint device 108.

In one embodiment, the control server 105 serves requests for metadata associated with digital content files. The metadata, also referred to herein as DRM data, is used for requesting a license authorizing playback of a digital content file. In one embodiment, the metadata includes a stream header and/or a DRM header. The stream header includes one or more media attributes associated with a digital content file. At least in some embodiments, the media attributes do not contain DRM information associated with the digital content file. Examples of the media attributes include: (i) an indication of a first location of the digital content file and (ii) one or more one or more alternative locations of a digital content file should the digital content file not be reachable via the first location. Each location may be expressed as a Uniform Resource Identifier (URI). In some embodiments, each alternative location corresponds to a distinct CDN. Other examples of media attributes include a resolution or bit rate of the digital content file, a number of audio channels associated with the digital content file, subtitle information associated with the digital content file, audio tracks associated with the digital content file, an aspect ratio of the digital content file, and a codec associated with the digital content file.

In one embodiment, the endpoint device 108 generates DRM information sent to the DRM server 106. This DRM information is sent by endpoint device 108 to DRM server 106 to protect the license response (i.e., the DRM server 106 uses the DRM information info to encrypt the license response so only the endpoint device 108 can decrypt the license). The license information may include an authentication/authorization token, device DRM information, and stream DRM information. The stream DRM information includes a key identifier that obviates the need for the endpoint device 108 to download the stream header to extract the same information. The DRM license also contains a decryption key used to decrypt the digital content file.

Although embodiments are described herein are described with reference to the control server 105 providing both the stream header and the DRM header, other embodiments are broadly contemplated. For example, in an alternative embodiment, DRM headers are stored as part of the digital content files in the CDN 102, rather than on the control server 105. In such embodiments, the control server 105 serves requests for stream headers, and the CDN 102 serves requests for the DRM headers.

In one embodiment, the DRM server 106 serves requests for licenses associated with encrypted digital content files received from the endpoint device 108. In operation, an encrypted digital content file downloaded from the CDN 102 by the endpoint device 108 must be decrypted before the digital content file can be played. The DRM server 106 transmits the license associated with the encrypted digital content file to the endpoint device 108, which in turn uses a key included in the license to decrypt the digital content file. In some embodiments, each key is generated on-the-fly for each session, to authorize the endpoint device 108 to stream a media title. In other embodiments the key with which the file has been encrypted is retrieved from a database on the server side and then packaged in the license. In such embodiments, the key may be provided to the endpoint device 108 upon receiving valid credentials (e.g., a user name and a password) from the endpoint device 108. Further, in some embodiments, some or all of the functionality of the DRM server 106 may be integrated into the control server 105.

Although, in the above description, the content distribution system 100 is shown with one endpoint device 108 and one CDN 102, persons skilled in the art will recognize that the architecture of FIG. 1 may typically support a large number of endpoint devices 108 as well as multiple CDNs 102. Thus, FIG. 1 is not intended to limit the scope of the present invention.

Figure 2:
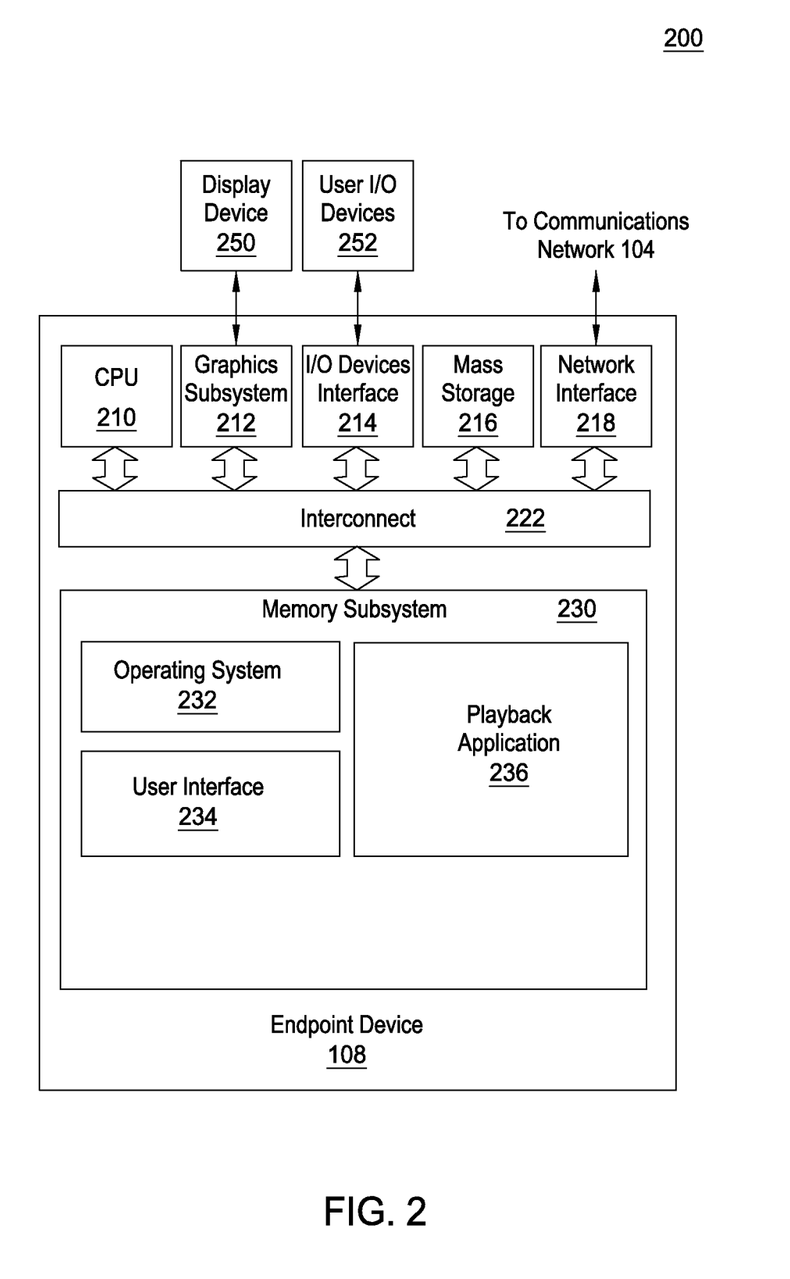
FIG. 2 is a block diagram illustrating components of an endpoint device, according to one embodiment of the invention.

FIG. 2 is a block diagram illustrating components of the endpoint device 108 of FIG. 1, according to one embodiment of the invention. As shown, the components 200 include, without limitation, a central processing unit (CPU) 210, a graphics subsystem 212, an input/output (I/O) device interface 214, a mass storage unit 216, a network interface 218, an interconnect 222, and a memory subsystem 230. Depending on the embodiment, the endpoint device may be, without limitation, a conventional computing system, e.g., a desktop PC, a laptop computer, or home theatre PC (HTPC), or any of a variety of end-user client devices, including, e.g., mobile telephones, tablet and net-book computing devices, console and handheld video game systems, digital video recorders (DVRs), DVD players, connected digital TVs, and dedicated media streaming devices, (e.g., the Roku® set-top box), etc.

In one embodiment, the CPU 210 is configured to retrieve and execute programming instructions stored in the memory subsystem 230. Similarly, the CPU 210 is configured to store and retrieve application data residing in the memory subsystem 230. The interconnect 222 is configured to facilitate transmission of data, such as programming instructions and application data, between the CPU 210, graphics subsystem 212, I/O devices interface 214, mass storage 216, network interface 218 and memory subsystem 230.

In one embodiment, the graphics subsystem 212 is configured to generate frames of video data and transmit the frames of video data to display device 250. In one embodiment, the graphics subsystem 212 may be integrated into an integrated circuit, along with the CPU 210. The display device 250 may comprise any technically feasible means for generating an image for display. For example, the display device 250 may be fabricated using liquid crystal display (LCD) technology, cathode-ray technology, and light-emitting diode (LED) display technology (either organic or inorganic). An input/output (I/O) device interface 214 is configured to receive input data from user I/O devices 252 and transmit the input data to the CPU 210 via the interconnect 222. For example, user I/O devices 252 may comprise one of more buttons, a keyboard, and a mouse or other pointing device. The I/O device interface 214 also includes an audio output unit configured to generate an electrical audio output signal. User I/O devices 252 includes a speaker configured to generate an acoustic output in response to the electrical audio output signal. In alternative embodiments, the display device 250 may include the speaker. A television is an example of a device known in the art that can display video frames and generate an acoustic output. A mass storage unit 216, such as a hard disk drive or flash memory storage drive, is configured to store non-volatile data. A network interface 218 is configured to transmit and receive packets of data via the communications network 120. In one embodiment, the network interface 218 is configured to communicate using the well-known Ethernet standard. The network interface 218 is coupled to the CPU 210 via the interconnect 222.

In one embodiment, the memory subsystem 230 includes programming instructions and data that comprise an operating system 232, a user interface 234 and a playback application 236. The operating system 232 performs system management functions such as managing hardware devices including the network interface 218, mass storage unit 216, I/O device interface 214, and graphics subsystem 212. The operating system 232 also provides process and memory management models for the user interface 234 and the playback application 236. The user interface 234, such as a window and object metaphor, provides a mechanism for user interaction with endpoint device 108. Persons skilled in the art will recognize the various operating systems and user interfaces that are well-known in the art and suitable for incorporation into the endpoint device 108.

In one embodiment, the playback application 236 is configured to retrieve encrypted digital content from the CDN 102 via the network interface 218. The playback application 236 may also decrypt and render the retrieved digital content. In operation, the playback application 236 first retrieves, from the control server 105, metadata associated with a digital content file to be played from the CDN 102. As described above, the metadata may include the stream header and/or the DRM header associated with the digital content. Based on the retrieved metadata, the playback application 236 generates a request for a DRM license. The playback application 236 then sends the generated request to the DRM server 106.

As described above, in one embodiment, upon receiving the request for a DRM license, the DRM server 106 transmits a DRM license associated with the digital content file to be played to the playback application 236. The DRM license includes the decryption key needed to decrypt the encrypted digital content file. At the same time (or after receiving the DRM licensee) the playback application 236 retrieves encrypted content. Upon receipt, the playback application 236 decrypts and renders the retrieved digital content, based on the DRM license. In some embodiments, the DRM license may also include a key used to create a session key and may include a cryptographic token to be presented to the CDN 102, authorizing the endpoint device 108 to receive the encrypted media title from the CDN 102.

Figure 3:
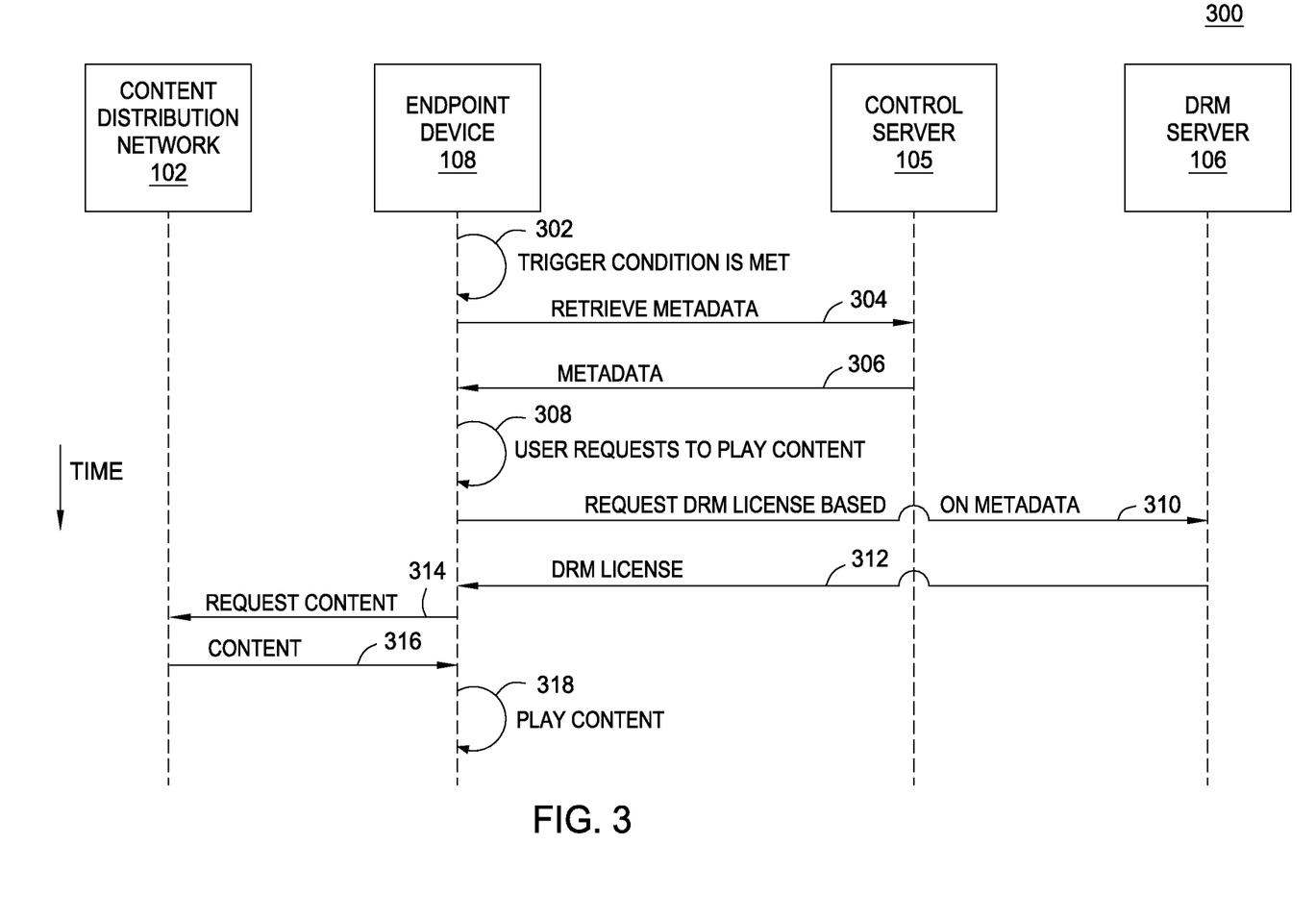
FIG. 3 is a sequence diagram depicting a method for streaming digital media content, according to one embodiment of the invention.

FIG. 3 is a sequence diagram depicting a method 300 for streaming digital media content, according to one embodiment of the invention. As shown, the method 300 begins at step 302, where the endpoint device 108 detects that a trigger condition is satisfied. When the trigger condition is satisfied, the endpoint device 108 retrieves metadata from the control server 105. As used herein, the trigger condition refers to any condition that is defined in terms user input received or output displayed via the user interface 234—other than a user request to play a digital media content title. An example of a trigger condition is a user-controlled cursor hovering over a display element in the user interface 234, for a predefined period of time, where the display element is associated with a digital media content title. For instance, the display element may be any text or graphical icon associated with the digital media content title. Another example of a trigger condition is receipt of a user request to view detailed information associated with a digital media content title. For instance, the user may request to view a character cast associated with the digital media content title. The trigger condition may be defined by a developer and/or administrator of the playback application 536 and may be tailored to suit the needs of a particular case.

In one embodiment, once the trigger condition is satisfied, the endpoint device 108 retrieves, from the control server 105, metadata associated with one or more digital media content titles (steps 304 and 306). The endpoint device 108 may identify the one or more digital media content titles based on the particular manner in which the trigger condition is satisfied. For example, the endpoint device 108 may retrieve metadata associated with a particular movie, upon detecting that a user-controlled cursor hovering over a graphical icon representing the particular movie. In another embodiment, if the trigger condition is a user viewing a content selection screen for a predefined time period, then the endpoint device 108 retrieves metadata associated with all movies visible on the content selection screen.

At step 308, the endpoint device 108 receives a user request to play one of the digital media content titles. At step 310, the endpoint device 108 generates a DRM license request based on the retrieved metadata and sends the DRM request to the DRM server 106. The DRM server 106 may provide a DRM license to the endpoint device 108 (step 312). As described above, in some embodiments, some or all of the functionality of the DRM server 106 may be integrated into the control server 105. Upon receiving the DRM license 312, the endpoint device 108 may request the digital media content title from the CDN 102, based on the retrieved metadata 304 (steps 314 and 316). The endpoint device 108 may then decrypt and play the digital media content title (step 318). After the step 318, the method 300 terminates.

By configuring the endpoint device 108 to retrieve metadata upon the trigger condition being met, the perceived (and/or actual) delay between the time a user requests to play a digital media content title and the time playback of the digital media content title commences may be reduced at least in some cases. In particular, the perceived delay may be reduced because the metadata is retrieved prior to the user requesting to play the digital media content title. Put another way, at the time that the user requests to play the digital media content title, the metadata has already been retrieved and may be immediately used to request a DRM license for the digital media content title. Retrieving the metadata prior to the user requesting to play the digital media content title may reduce the perceived delay by at least five hundred milliseconds (i.e., half a second) in some cases.

Further, in one embodiment, the trigger event may be tailored to retrieve metadata only for digital media content titles that the user is likely to subsequently request to play. For example, a user-controlled cursor hovering over a thumbnail image associated with a digital media content title may indicate a high likelihood that the user will subsequently request to play the digital media content title (e.g., by clicking on the thumbnail image with a pointing device). Further, any processing overhead incurred from retrieving metadata for digital media content titles that the user ultimately does not request to play may be outweighed by the improved user experience for digital media content titles that the user does request to play.

Further, in one embodiment, the tradeoff between the processing overhead and the improved user experience may also be managed via one or more trigger events. For example, in cases where the improved user experience is deemed to be much more desirable than avoiding the processing overhead, the trigger event may be defined such that all visible display elements of each user interface screen trigger retrieval of metadata. For instance, mere display of a thumbnail image of a digital media content title may be sufficient for the endpoint device 108 to retrieve the metadata associated with the digital media content title—regardless of the position of the user-controlled cursor. In another embodiment, the endpoint device 108 only retrieves associated with thumbnail images within a predefined vicinity of the user-controlled cursor in the user interface 234. For example, the predefined vicinity may be measured in terms of a number of pixels from the user-controlled cursor.

Figure 4A:
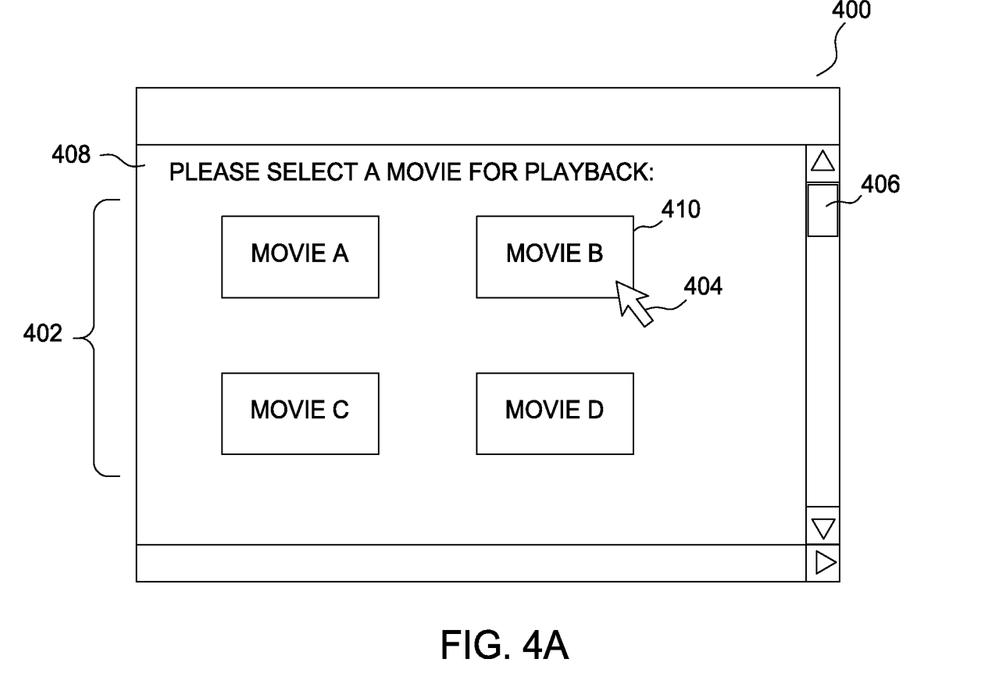
FIGS. 4A-4B illustrate example graphical user interface (GUI) screens of the endpoint device, according to one embodiment of the invention.
Figure 4B:
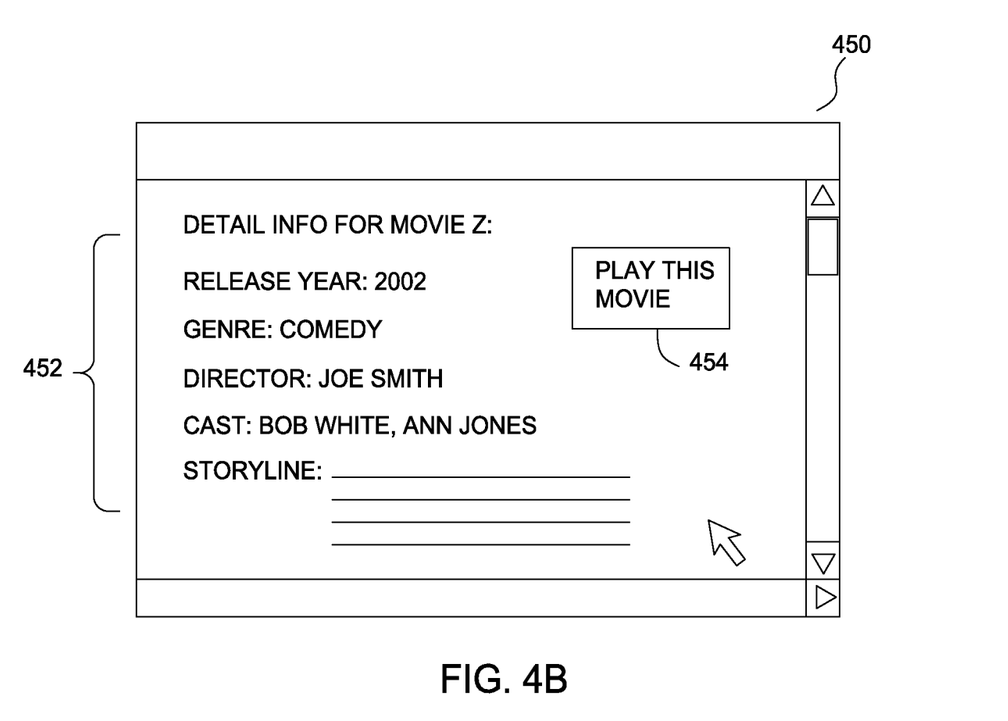

FIGS. 4A-4B illustrate example graphical user interface (GUI) screens 400, 450 of the endpoint device 108, according to one embodiment of the invention. As shown in FIG. 4A, the GUI screen 400 includes display elements 402, each representing a distinct movie. The GUI screen 400 also includes an indication 408 for a user to select a movie for playback. The GUI screen 400 also includes a scroll bar 406 for scrolling through display elements in the GUI screen 400. By using the scroll bar 406, the user may affect the visibility of display elements in the GUI screen 400, such as replacing the display elements 402 with other display elements.

The GUI screen 400 of FIG. 4A also includes a user-controlled cursor 404. As shown, the user-controlled cursor 404 is hovering over the display element 410 associated with "Movie B". As described above, hovering over the display element 410 for a predefined period of time (such as two seconds) may satisfy the trigger condition and cause the endpoint device 108 to retrieve, from the control server 105, metadata associated with Movie B. If the user subsequently requests to play Movie B (e.g., by clicking on the display element 410), playback of Movie B may commence with a reduced delay, relative to other approaches.

In this particular example, the metadata associated with other movies (such as Movies A, C and D) are not retrieved. In an alternative embodiment, however, the trigger condition is defined such that the endpoint device 108 retrieves metadata associated with all display elements that are visible in the GUI screen 400. Put another way, the endpoint device 108 retrieves metadata for each of Movies A, B, C and D—regardless of the position of the user-controlled cursor in the GUI screen 400. For example, the four titles, A, B, C, D, could each represent a movie title available for streaming. In such a case, when the user switches from this current page to another, (showing movie titles E, F, G, and H), the metadata for these latter four movies is retrieved.

As shown in FIG. 4B, the GUI screen 450 includes detailed information for a particular movie ("Movie Z"). The GUI screen 450 also includes a button 454 for playing the movie. As shown, the detailed information includes a release year, a genre, a director, a cast, and a storyline. In one embodiment, the trigger condition is defined based on display of the detailed information. For example, if the detailed information for Movie Z is visible in the GUI screen for a predefined period of time (e.g., ten seconds), then the trigger condition is satisfied, and the endpoint device 108 retrieves metadata for Movie Z. Advantageously, the user subsequently requests to play Movie Z (e.g., by clicking on the display element 454), playback of Movie Z may commence with a reduced delay, relative to other approaches. In an alternative embodiment, mere display of the detailed information for Movie Z (or the request thereof) is sufficient to satisfy the trigger condition, regardless of the length of time for which the detailed information is visible in the GUI screen.

Figure 5:
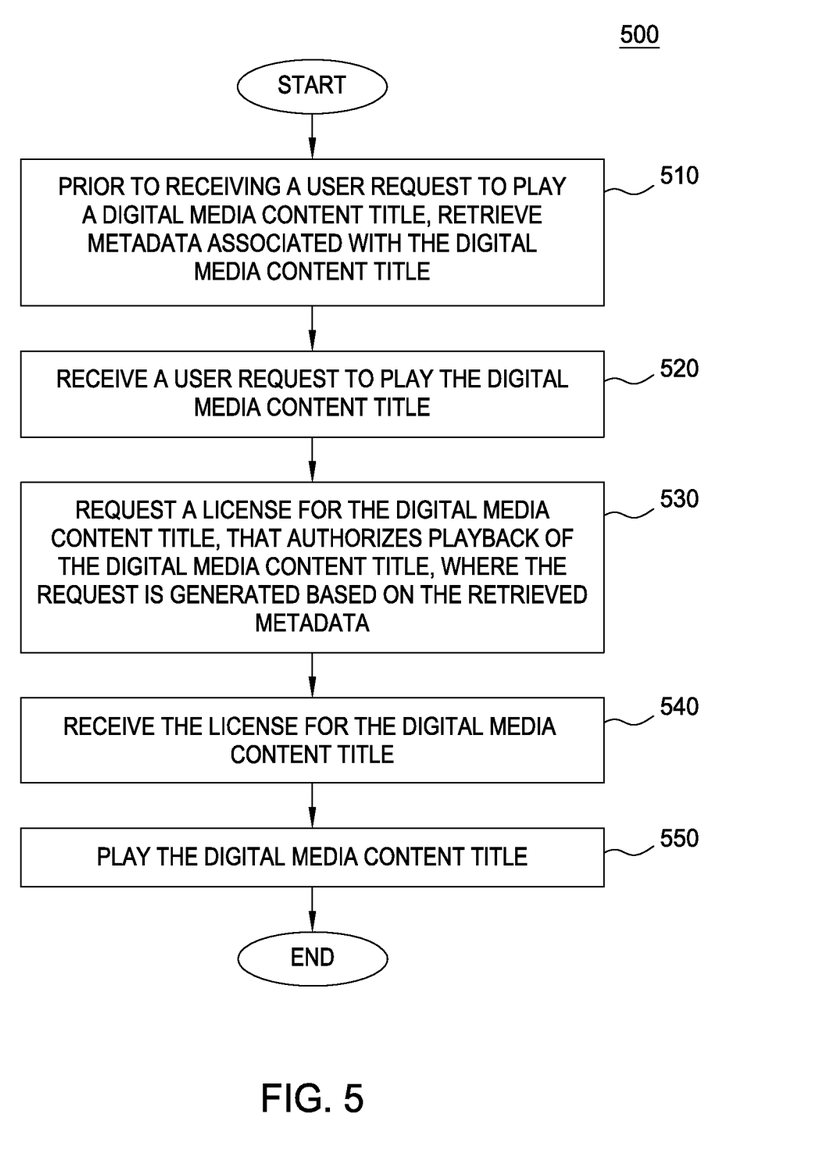
FIG. 5 is a flowchart depicting a method for streaming digital media content, from the perspective of the endpoint device, according to one embodiment of the invention.

FIG. 5 is a flowchart depicting a method 500 for streaming digital media content, from the perspective of the endpoint device 108 of FIG. 1, according to one embodiment of the invention. As shown, the method 500 begins at step 510, where the endpoint device 108 retrieves, from the control server 105, metadata associated with a digital media content title. The metadata may be retrieved prior to receiving a user request to play the digital media content title. At step 520, the endpoint device 108 receives a user request to play the digital media content title. At step 530, the endpoint device 108 requests a DRM license for the digital media content title. The DRM license authorizes playback of the digital media content title. The request is generated based on the retrieved metadata. At step 540, the endpoint device 540 receives, from the DRM server 106, the DRM license for the digital media content title. At step 550, the endpoint device 540 plays the digital media content title that is received from the CDN 102. After the step 550, the method 500 terminates.

Advantageously, embodiments of the invention provide techniques for streaming digital media content. One embodiment provides an endpoint device that retrieves metadata associated with a digital media content title, prior to receiving any user request to play the digital media content title. Upon subsequently receiving a user request to play the digital media content title, the endpoint device generates a DRM license request, based on the retrieved metadata. The endpoint device then sends the request to a DRM server. Upon receiving a DRM license from the DRM server, the endpoint device plays the digital media content title, responsive to the user request. Advantageously, the perceived delay between the time a user requests to play a digital media content title and the time playback of the digital media content title commences may be reduced at least in some cases.

One embodiment of the invention may be implemented as a program product stored on computer-readable storage media within the endpoint device 108. In this embodiment, the endpoint device 108 comprising an embedded computer platform such as a set top box. An alternative embodiment of the invention may be implemented as a program product that is downloaded to a memory within a computer system, for example as executable instructions embedded within an internet web site. In this embodiment, the endpoint device 108 comprises the computer system.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present invention is determined by the claims that follow.

We claim:

1. A computer-implemented method to reduce streaming playback delay, the computer-implemented method comprising:
   defining, by an endpoint device, a first trigger condition comprising displaying of a display element in a user interface for a predetermined time period;
   displaying, by the endpoint device, a first display element in the user interface, the first display element being associated with a first media title of a plurality of media titles available for streaming playback;
   determining, by the endpoint device, that the first display element is displayed in the user interface for the predetermined time period;
   in response to determining that the first display element is displayed in the user interface for the predetermined time period, by the endpoint device, retrieving digital rights management (DRM) data associated with the first media title from a control server;
   subsequent to retrieving the DRM data, by the endpoint device, receiving a request to begin streaming playback of the first media title; and
   in response to receiving the request to begin streaming playback of the first media title, by the endpoint device, performing the steps of:
      requesting a license for the first media title from a DRM server using the DRM data;
      requesting the first media title from a content distribution network; and
      streaming playback of the first media title from the content distribution network using the license for the first media title.

2. The computer-implemented method of claim 1, wherein DRM data is retrieved for a second media title of the plurality of media titles upon detecting that a second trigger condition is satisfied.

3. The computer-implemented method of claim 2, wherein the second trigger condition comprises a user-controlled cursor hovering over a second display element associated with the second media title, for a predefined period of time.

4. The computer-implemented method of claim 2, wherein the second trigger condition comprises a second display element being visible in the user interface, wherein the second display element is associated with the second media title.

5. The computer-implemented method of claim 1, wherein retrieving the DRM data reduces a delay between receiving the request to begin streaming playback and streaming playback, wherein the delay is reduced by at least a duration of retrieving the DRM data.

6. The computer-implemented method of claim 1, wherein the plurality of media titles are provided by the content distribution network, wherein the content distribution network, the endpoint device, the control server, and the DRM server are distinct entities each operatively connected to a communications network.

7. The computer-implemented method of claim 6, wherein the plurality of media titles comprise a plurality of distinct media titles, wherein in respective instances:
   (i) only the DRM data associated with the first one of the plurality of media titles is retrieved;
   (ii) DRM data associated with greater than one, but less than all, of the plurality of media titles is retrieved; and
   (iii) DRM data associated with all of the plurality of media titles is retrieved.

8. The computer-implemented method of claim 2, wherein the second trigger condition comprises a cursor being within a predefined vicinity of a second display element visible in the user interface, wherein the second display element is associated with the second media title.

9. The computer-implemented method of claim 8, wherein the predefined vicinity of the second display element is based on a number of pixels from the cursor.

10. The computer-implemented method of claim 8, wherein the second display element comprises text or a graphical icon associated with the second media title.

11. The computer-implemented method of claim 1, wherein the DRM data comprises a Uniform Resource Identifier (URI) that indicates a location of content for the first media title on the content distribution network.

12. The computer-implemented method of claim 1, wherein the DRM data comprises a resolution of the first media title, a bit rate of the first media title, a number of audio channels associated with the first media title, subtitle information associated with the first media title, audio tracks associated with the first media title, an aspect ratio of the first media title, or a codec associated with the first media title.

13. The computer-implemented method of claim 1, wherein the DRM data is retrieved regardless of a position of a user-controlled cursor within the user interface.

14. The computer-implemented method of claim 1, further comprising:
   receiving a scroll input for displaying a second display element in the user interface, the second display element being associated with a second media title of the plurality of media titles available for streaming playback; and
   in response to receiving the scroll input, retrieving DRM data associated with the second media title.

15. The computer-implemented method of claim 1, further comprising, prior to receiving the license for the first media title, beginning downloading of the first media title without decrypting the first media title.

16. One or more non-transitory computer-readable media containing a program which, when executed by one or more processors, performs an operation to reduce streaming playback delay, the operation comprising:

defining, by an endpoint device, a first trigger condition comprising displaying of a display element in a user interface for a predetermined time period;

displaying, by the endpoint device, a first display element in the user interface, the first display element being associated with a first media title of a plurality of media titles available for streaming playback;

determining, by the endpoint device, that the first display element is displayed in the user interface for the predetermined time period;

in response to determining that the first display element is displayed in the user interface for the predetermined time period, by the endpoint device, retrieving digital rights management (DRM) data associated with the first media title from a control server;

subsequent to retrieving the DRM data, by the endpoint device, receiving a request to begin streaming playback of the first media title; and in response to receiving the request to begin streaming playback of the first media title, by the endpoint device, performing the steps of:

requesting a license for the first media title from a DRM server using the DRM data;

requesting the first media title from a content distribution network; and streaming playback of the first media title from the content distribution network using the license for the first media title.

17. The one or more non-transitory computer-readable media of claim 16, wherein DRM data is retrieved for a second media title of the plurality of media titles upon detecting that a second trigger condition is satisfied.

18. The one or more non-transitory computer-readable media of claim 17, wherein the second trigger condition comprises a user-controlled cursor hovering over a second display element associated with the second media title, for a predefined period of time.

19. The one or more non-transitory computer-readable media of claim 17, wherein the second trigger condition comprises a second display element being visible in the user interface, wherein the second display element is associated with the second media title.

20. A system to reduce streaming playback delay, the system comprising:

one or more computer processors;

a memory containing a program, which when executed by the one or more computer processors is configured to perform an operation comprising:

defining a first trigger condition comprising displaying of a display element in a user interface for a predetermined time period;

displaying a first display element in the user interface, the first display element being associated with a first media title of a plurality of media titles available for streaming playback;

determining that the first display element is displayed in the user interface for the predetermined time period;

in response to determining that the first display element is displayed in the user interface for the predetermined time period, retrieving digital rights management (DRM) data associated with the first media title from a control server;

subsequent to retrieving the DRM data, receiving a request to begin streaming playback of the first media title; and in response to receiving the request to begin streaming playback of the first media title, performing the steps of:

requesting a license for the first media title from a DRM server using the DRM data;

requesting the first media title from a content distribution network; and streaming playback of the first media title from the content distribution network using the license for the first media title.

21. The system of claim 20, wherein the DRM data is retrieved for a second media title of the plurality of media titles upon detecting that a second trigger condition is satisfied.

22. The system of claim 21, wherein the second trigger condition comprises a user-controlled cursor hovering over a second display element associated with the second media title, for a predefined period of time.

23. The system of claim 21, wherein the second trigger condition comprises a second display element being visible in the user interface, wherein the second display element is associated with the second media title.

* * * * *

UNITED STATES PATENT AND TRADEMARK OFFICE
CERTIFICATE OF CORRECTION

PATENT NO. : 10,694,258 B2
APPLICATION NO. : 13/326122
DATED : June 23, 2020
INVENTOR(S) : Kaiser et al.

Page 1 of 1

It is certified that error appears in the above-identified patent and that said Letters Patent is hereby corrected as shown below:

In the Claims

Column 12, Claim 21, Line 32, please delete "the" after wherein.

Signed and Sealed this
Twenty-second Day of September, 2020

Andrei Iancu
*Director of the United States Patent and Trademark Office*